March 6, 1928.  
G. R. LIVERGOOD  
PIPE SUPPORTING DEVICE  
Filed April 5, 1926  
1,661,838  
4 Sheets-Sheet 2

Gerald R. Livergood, Inventor

By Jesse R. Stone, Attorney

March 6, 1928. 1,661,838
G. R. LIVERGOOD
PIPE SUPPORTING DEVICE
Filed April 5, 1926   4 Sheets-Sheet 4

Gerald R. Livergood  Inventor

By  Jesse R. Stone
Attorney

Patented Mar. 6, 1928.

1,661,838

UNITED STATES PATENT OFFICE.

GERALD R. LIVERGOOD, OF HOUSTON, TEXAS.

PIPE-SUPPORTING DEVICE.

Application filed April 5, 1926. Serial No. 99,910.

My invention relates to apparatus for supporting pipe in wells. It has application to and is especially adapted for holding drill pipe while said pipe is being inserted into or withdrawn from the well. It may be used on different sizes of pipe and is not confined in its operation to drill stem alone.

It is an object of the invention to provide a device for use in well drilling operations for efficiently gripping and supporting the pipe at any adjusted position of the pipe in the well.

It is desired that the gripping device be constructed to efficiently engage and clamp itself to the pipe through a plurality of clamping elements. It is also desired that the device be capable of mechanical operation so that the pipe will be gripped and held by uniform pressure on all sides of the pipe, thereby preventing mutilation of the pipe in use.

It is also an object to provide a pipe gripping device of the character stated which may be quickly placed in position about the pipe. Other objects and advantages of the invention residing in the particular construction and arrangement of the parts will be set out with greater clearness in the specification which follows.

Figure 1:
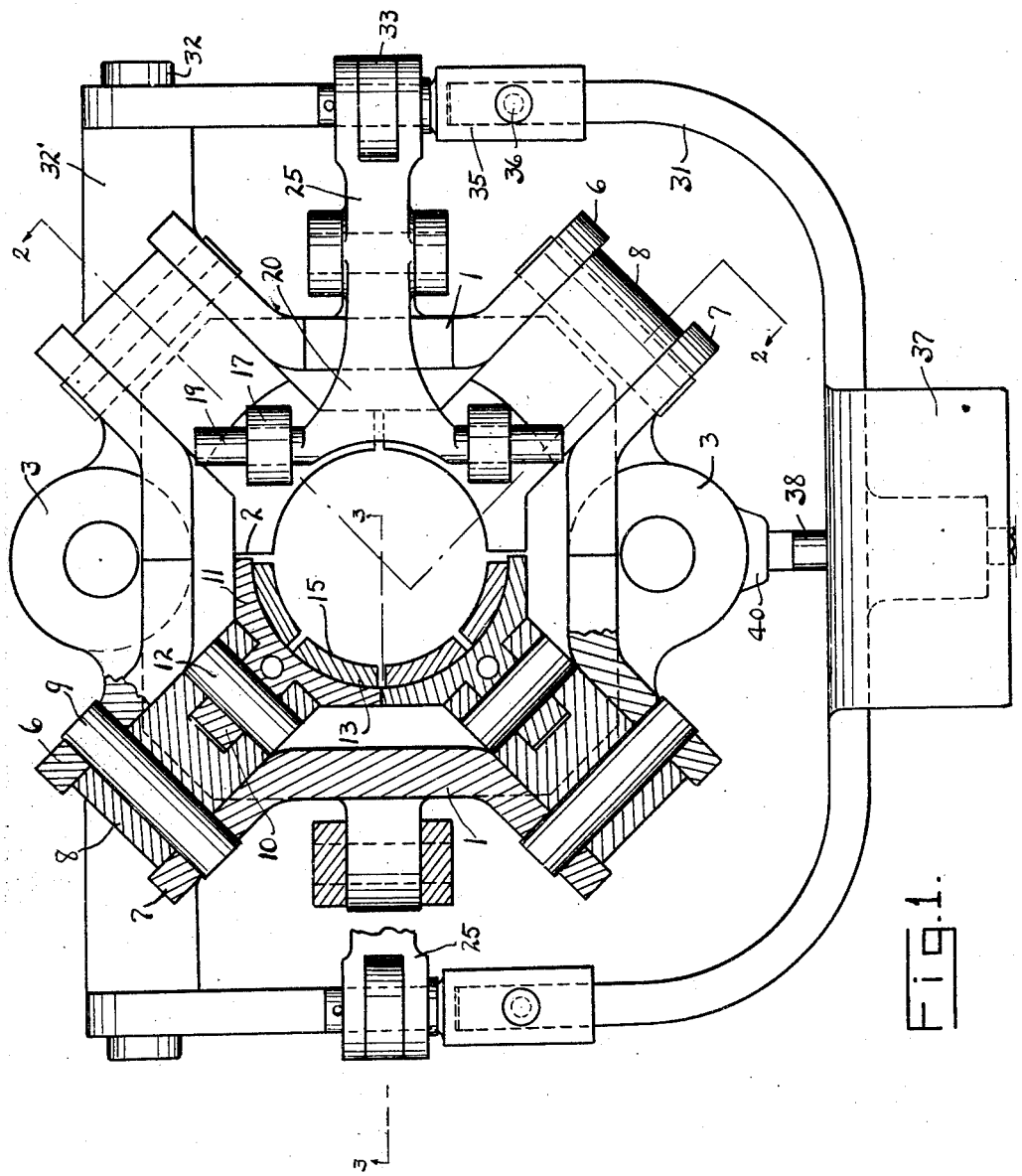
Figure 2:
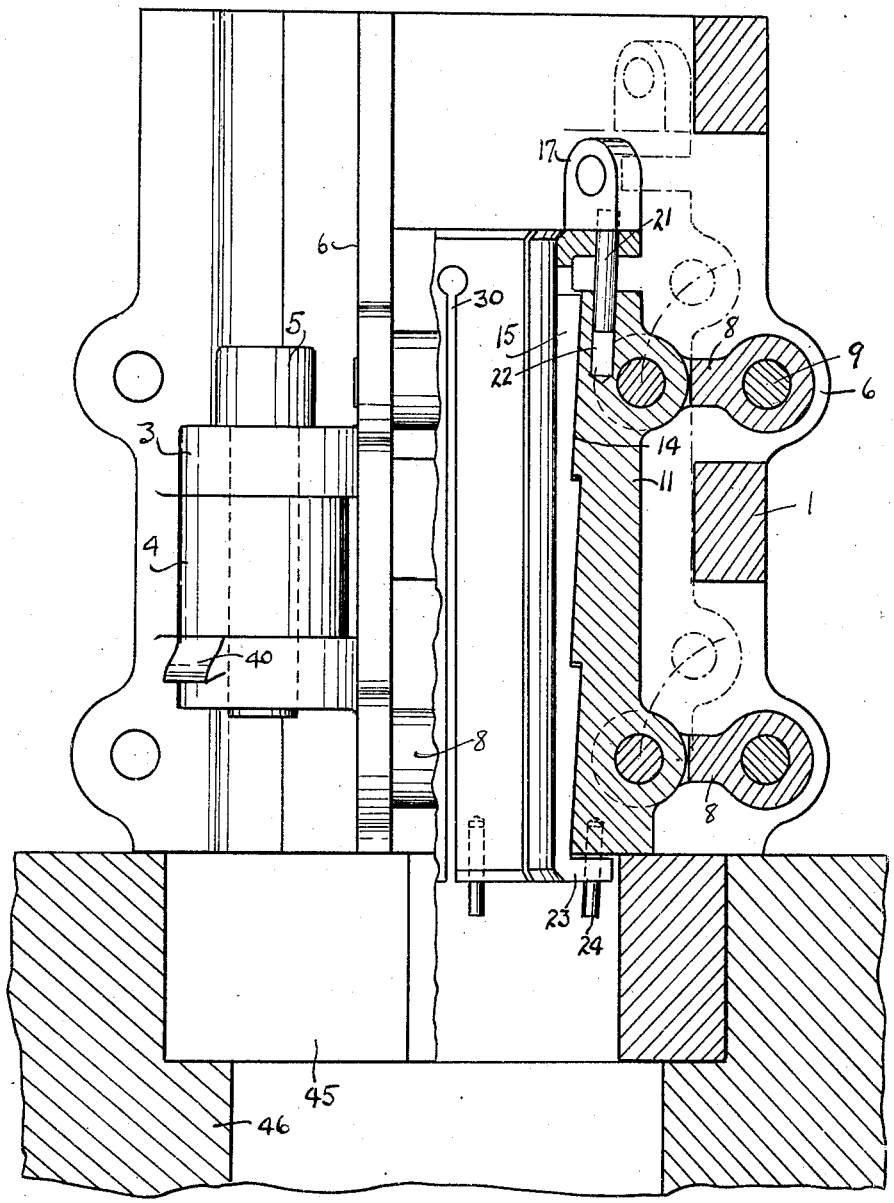
Figure 3:
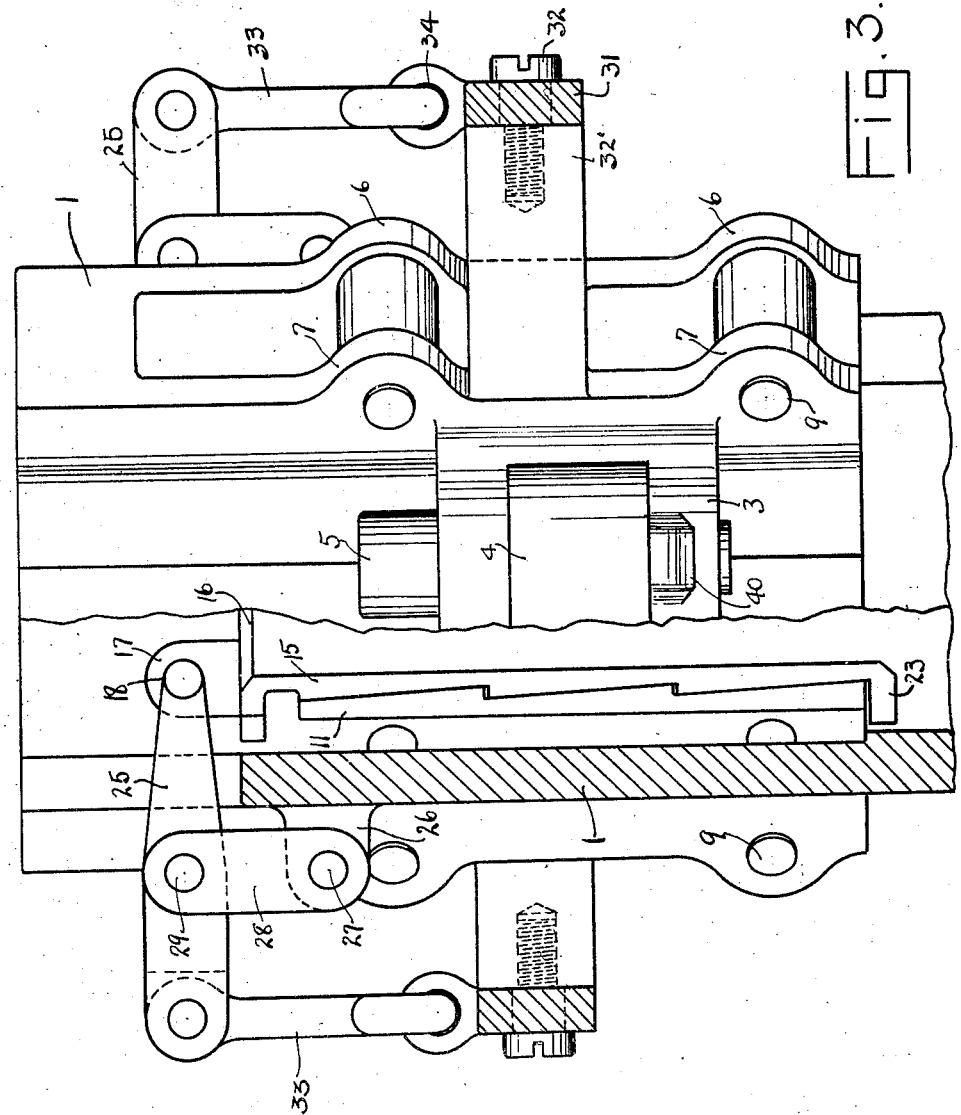
Figure 4:
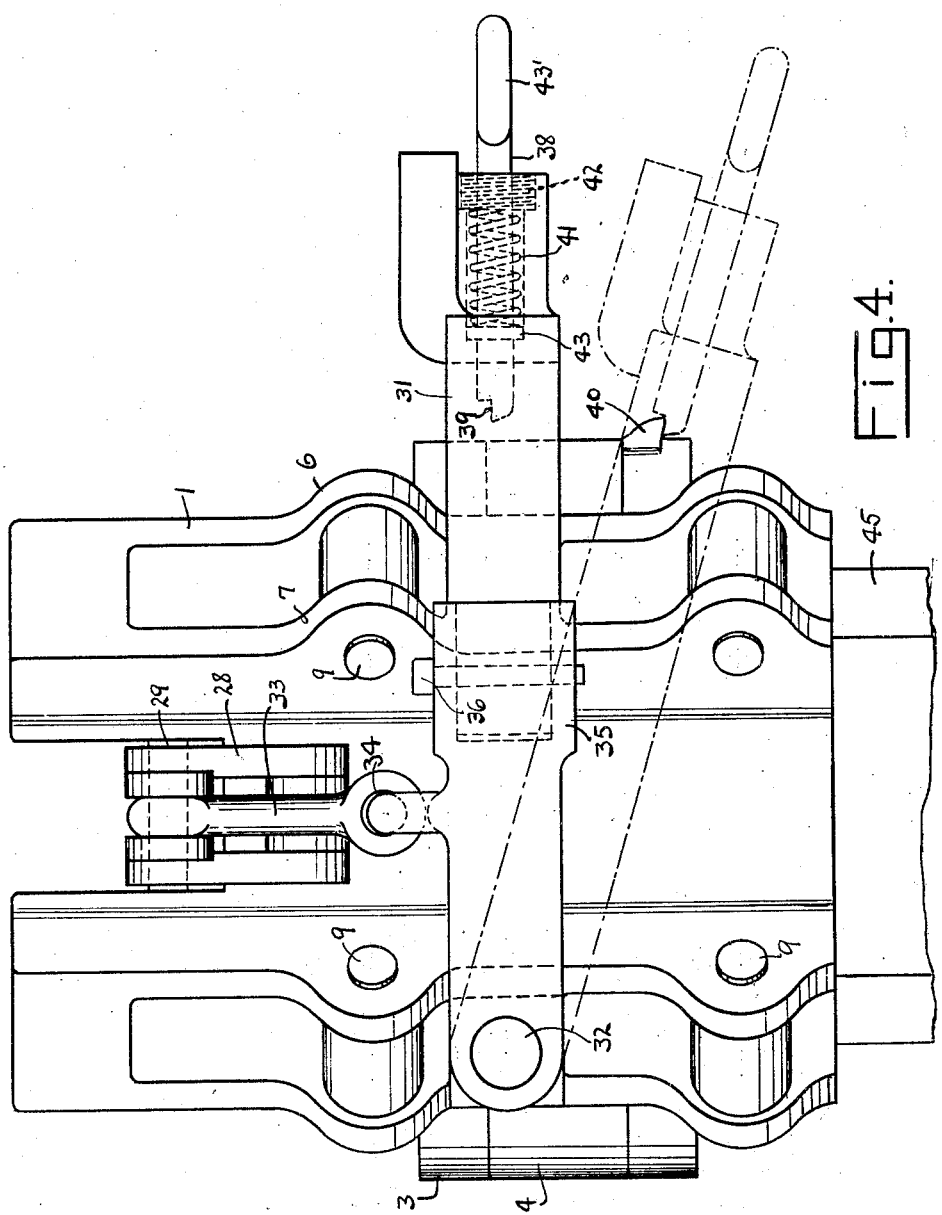

Referring to the drawing herewith, Fig. 1 is a top plan view of the device, certain parts being in horizontal section for greater clearness. Fig. 2 is a side elevation partly in section on the line 2—2 of Fig. 1. Fig. 3 is a side elevation partly in section on the line 3—3 of Fig. 1. Fig. 4 is a side elevation of the device looking from the left in Fig. 1. Like numerals of reference are employed to designate like parts in all the views.

In constructing my device, I provide an upright supporting housing 1 which is approximately rectangular in shape, as shown in Fig. 1. Said housing is formed in two sections fitting together along the line 2, said sections being joined together by means of two opposite sets of lugs 3 and 4 interfitting, as shown in Fig. 3, to form what is approximately a hinged connection, the lugs 3 and 4 interfitting and having a central vertical opening therethrough to receive a pin 5 which serves as a latching pin to hold the parts in assembled position but being removable so that the two halves of the housing may be taken apart when they are to be placed about the drill stem or removed therefrom.

The two halves of the housing are each formed with radially extending lugs 6 and 7 thereon at spaced points on the outer face of the housing to provide support for links 8 upon which the pipe gripping members are connected. The lugs 6 and 7 are arranged in pairs adjacent the lugs 3 and 4, and thus provide supports for the pipe gripping members. The lugs 6 and 7 form bearings at both the upper and lower ends of the housing, the upper bearing 9 being spaced downwardly from the upper end of the housing and the lower one being closely adjacent the lower end. The bearing pins 9 extending through the lugs 6 and 7 furnish pivot pins for the links 8 which extend inwardly at each of the corners of the housing, the forward end of the links being forked and connected to an arm 10 upon the jaw 11, the said arm fitting between the two prongs of the link and pivotally connected thereto by means of the cross pin 12. It is to be understood that the jaws 11 are thus connected by the links 8 to the housing and extend through slots in the wall thereof at both the upper and lower ends; see Fig. 2.

The jaw 11 is arcuate on its inner face 13 and is formed with a plurality of downwardly inclined areas 14. As seen in Fig. 2, I have shown three stages of the downwardly inclined faces, the upper end of the lower areas being offset from the lower end of the next adjacent to provide a series of tapered faces of equal inclination upon each of which is fitted a slidable gripping member 15. Said gripping member is also arcuate in cross section and cut on a circular arc on its inner face, the outer face being formed with three stages of taper to fit upon the inner tapered faces of the jaw. Each gripping member is preferably split from the lower end upwardly to a point closely adjacent the upper end, as shown at 30 in Fig. 2. The inner gripping member 15 is extended above the jaw 11, as indicated in Figs. 2 and 3, the upper end being beveled slightly at 16 and said gripping members are provided with an upwardly extending lug 17 which has a central opening 18 therethrough to receive a pin 19 upon the operating arm 25. From Fig. 1 it will be noted that the perforated lug 17 is set at an angle to the gripping member so that the pin 19 extending therethrough may be set in a line parallel with the plane of division between the two halves of the housing shown at 2.

The jaw and the gripping face thereon are movable relative to each other and a guide pin 21 on the upper end of the gripping member is extended downwardly into a recess 22 in the jaw to assist in holding the gripping member in position upon the jaw at the upper end. The outwardly extending rim 23 upon the lower end of the gripping member has a pin 24 extending therethrough into the lower end of the jaw 11, thus holding the jaw and gripping member in contact at the lower end.

The jaw and the gripping face thereon are moved through the same operating lever 25 and I have so arranged the operation of the gripping device that but two operating levers are required, one on each of the two halves of the housing. I have, therefore, formed on opposite sides and approximately midway of each section of the housing a supporting bracket 26 which has an opening therein to receive the pin 27 upon which is pivoted a pair of links 28 which connect pivotally at their upper ends to a pin 29 extending through the lever 25 at a point approximately midway of said lever. The two links 28 thus provide a swinging fulcrum for the lever 25.

As will be noted particularly from Fig. 1, the inner arm 20 of the lever 25 is provided with two oppositely extending pins or shafts 19 which extend slidably through the lugs 17 upon the gripping members 15. This slidable connection between the lever and the jaw enables the jaws to have in effect a sliding movement on the pins 19 away from the lever arm, as the lever arm is raised, and to slide inwardly along the pins when the lever arm is dropped, thus allowing each jaw a vertical movement in its seat.

The two opposite lever arms 25 are operated to raise and lower the slips by means of an operating member 31, which is in the form of a U-shaped yoke pivoted on bearing pins 32 formed on the outer ends of supporting arms 32' extending parallel with the lever arms 25 from one side of the housing, as shown in Fig. 1. The bearing pin 32 is shown as being formed of a cap screw, screwed within the end of the arm 32' so that it may be removed when desired. The two arms of the U-shaped yoke have a pivotal connection with the outer ends of the levers 25. The supporting pin 32 is somewhat below the central point of the housing and the yoke is, therefore, connected with the levers through links 33. Said links are connected pivotally with the outer ends of the levers 25 and at their lower ends are connected with the arms of the yoke 31 through means of eyes 34 upon the upper portion of each arm or yoke 31. I have shown the yoke 31 as being jointed at each side so that it may be taken apart. This joint is shown at 35 and comprises a telescoping connection between the two parts of the yoke, the parts being held in assembled position by pins 36 extending downwardly through the two connecting parts.

The forward end of the yoke 31 is formed with a foot pedal 37 by means of which the yoke may be depressed to operate the levers through stepping on the same with the foot. A latch may be provided which is adapted to hold the lever in depressed position. Said latch is shown in the drawing as being formed of a bolt 38 extending through the forward end of the yoke 31 and having a latching point 39 at its forward end, said point being beveled on its lower side to engage the inclined upper face 40 of a lug formed upon the side of the housing, preferably upon the stationary portion 3, previously described. The said latch is adapted to be held in the latching engagement with the lug 40 by means of a spring 41 secured about the latching pin 38 and bearing against a stop 42 upon the yoke member on its outer end and against a radial flange 43 upon the pin at its forward end. A handle 43' is formed upon the pin so that it may be manually withdrawn from latching engagement when desired.

In the operation of my device, the housing may be taken apart for fitting about the pipe by removing the pins 5 and also removing the forward end of the yoke 31, as previously described. When thereafter the housing is fitted about the pipe, the sections of the housing will be secured together by replacing the pins 5 and connecting the forward end of the yoke with the rearward portion thereof. The housing has a squared downward extension 45 fitting within the rotary table 46, thus serving to support the housing in position.

The jaws may be raised into inoperative position by depressing the pedal 37 and engaging the latching member 38 beneath the lug 40. When the jaws are thus raised, the connection between the lever arms 25 and the gripping members will raise the gripping members and through engagement of the said gripping members 15 with the jaws 11, the jaws will also be raised. As the jaws are thus elevated, the swinging of the links 8 connected with the upper and lower ends of the jaws will draw the jaws outwardly away from the pipe. This action is indicated in dotted lines in Fig. 2. There will then be sufficient room inside the housing to operate the pipe as desired.

When it is desired to grip the pipe and hold it in adjusted position, the latch 38 will be released, raising the yoke 31 and the outer ends of the operating levers 25, thus allowing the gripping members and the jaws to drop. As they are thus dropped, the links 8 upon which the jaws are mounted will swing inwardly having an approximate toggle action to force the jaws into gripping engagement with the pipe. When the inner gripping members 15 come into frictional engagement with the pipe there will be a movement downwardly of the gripping member relative to the jaw, the said gripping member being thus moved inwardly by the tapered faces 14, thus tending to grip the pipes still more firmly. The gripping member will be somewhat flexible, due to the fact that it is split longitudinally and this slit 30 will also allow the draining off of mud or oil upon the pipe so that the gripping engagement may be more efficient.

The peculiar action obtained by the toggle links 8 and the tapered formation of the faces 14 upon the jaws will tend to firmly grip any weight of drill stem, or other pipe. It will also make it easy to withdraw the jaws from gripping engagement. This is due to the fact that when the lever arms 20 are raised, the gripping portion 15 will be drawn upwardly before the jaws themselves are moved. This will be readily accomplished because of the steep taper along the surfaces 14. The contact of the gripping members with the jaw will then act to raise the jaws carrying them away from the pipe, due to the toggle action of the links 8.

The advantages of my construction lie in its ease of operation and in the efficient gripping action obtained by the jaws upon the pipe without the necessity of any special gripping teeth upon the jaws. Other advantages residing in the particular construction and operation of the parts will be obvious to those skilled in the art.

What I claim as new and desire to protect by Letters Patent is:

1. In a pipe gripping device, a tubular housing, a plurality of pipe gripping jaws in said housing, upper and lower links connecting each of said jaws to said housing, inner gripping members secured to said jaws and having a limited vertical movement relative thereto, downwardly tapered faces on said jaws adapted to force said gripping members inwardly when relative downward movement is given to said gripping members, and means to raise and lower said jaws and gripping members, said means being connected to said gripping members and to said housing.

2. In a pipe gripping device, a tubular housing, a plurality of arcuate pipe-gripping jaws in said housing, links connecting the upper and lower ends of said jaws with said housing and tending to force said jaws inwardly when said jaws are dropped, gripping members mounted on said jaws, means tending to force said gripping members inwardly relative to said jaws when said gripping members are lowered, and means connected with said members to operate said jaws and gripping members.

3. In a pipe gripping device, a tubular housing, a plurality of arcuate pipe-gripping jaws in said housing, means on said housing to move said jaws outwardly when said jaws are raised, gripping members mounted on said jaws, means tending to force said gripping members inwardly relative to said jaws when said gripping members are lowered, and means to operate said jaws and gripping members, said operating means being connected with said gripping means and said housing.

4. In a pipe gripping device, a tubular housing, a plurality of arcuate pipe-gripping jaws in said housing arranged in sets of two, links connecting the upper and lower ends of said jaws with said housing and tending to force said jaws inwardly when said jaws are dropped, gripping members mounted on said jaws, means tending to force said gripping members inwardly relative to said jaws when said gripping members are lowered, and means to operate said jaws and gripping members, said operating means including operating levers connected with each set of said gripping members and means mounted on said housing to operate all of said levers simultaneously.

5. In a pipe-gripping device for rotaries, a tubular housing, a plurality of gripping members therein, levers connected with said members for raising and lowering the same, supporting jaws for said gripping members, means connected with said housing and with said jaws to maintain them in vertical position, and a tapered connection between said gripping members and said jaws, whereby said gripping members are forced inwardly when they are moved downwardly relative to said jaws.

6. In a pipe gripping device for rotaries, a tubular housing divided longitudinally into two sections, means to lock said sections together, a pair of pipe-gripping jaws on each section, a single lever on said housing for each pair of jaws, and a pair of links connecting each jaw to said housing, whereby said jaws are maintained in a vertical position as they are raised or lowered.

7. In a pipe-gripping device for rotaries, a tubular housing divided longitudinally into two sections, means to lock said sections together, a pair of pipe-gripping jaws on each section, a single lever fulcrumed on said housing for each pair of jaws, and a pair of links connecting each jaw to said housing, whereby said jaws are maintained in a vertical position as they are raised or lowered, a gripping member slidable on each jaw, said levers being connected with said gripping members, and means limiting the relative movement between said jaws and said gripping members.

8. In a pipe-gripping device for rotaries, a tubular housing divided longitudinally into two sections, means to lock said sections together, a pair of pipe-gripping jaws on each section, a single lever fulcrumed on said housing for each pair of jaws, and a pair of links connecting each jaw to said housing, whereby said jaws are maintained in a vertical position as they are raised or lowered, said levers being connected for simultaneous operation.

9. In a pipe-gripping device for rotaries, a tubular housing divided longitudinally into two sections, means to lock said sections together, a pair of pipe-gripping jaws on each section, a pair of links connecting each jaw to said housing, whereby said jaws are maintained in a vertical position as they are raised or lowered, and means connected with said links for raising and lowering all said jaws simultaneously.

10. In a pipe-holding device, a tubular housing, a plurality of arcuate gripping members therein, jaws upon which said members are mounted, a plurality of downwardly tapered surfaces on the inner side of said jaws, said gripping members being shaped to fit said tapered surfaces, said jaws and gripping members having a limited sliding movement relative to each other and means to raise said gripping members first, said gripping members acting to move said jaws.

11. In a pipe-holding device, a tubular housing, arcuate jaws hingedly connected therewith, gripping members on said jaws, the contacting faces of said jaws and said gripping members being tapered downwardly, means connecting said gripping members to said jaws allowing a sliding of said members on said jaws, and means connected with said members to raise and lower said members.

12. In a pipe-holding device, a tubular housing, jaws therein, arcuate gripping members on said jaws, the contacting faces between said jaws and gripping members being downwardly tapered, means connected with said gripping members to raise and lower said jaws and means on said housing connected with said jaws to move said jaws and gripping members away from said pipe when said jaws are raised.

In testimony whereof I hereunto affix my signature this 31st day of March, A. D. 1926.

GERALD R. LIVERGOOD.